United States Patent [19]
Van Hook

[11] Patent Number: 4,603,003
[45] Date of Patent: Jul. 29, 1986

[54] THERMAL ENERGY STORAGE

[75] Inventor: H. Jerrold Van Hook, Lexington, Mass.

[73] Assignee: Raytheon Company, Lexington, Mass.

[21] Appl. No.: 438,224

[22] Filed: Nov. 1, 1982

[51] Int. Cl.$^4$ .............................................. C09K 5/06
[52] U.S. Cl. ...................................................... 252/70
[58] Field of Search ......................................... 252/70

[56] References Cited

U.S. PATENT DOCUMENTS

| | | | |
|---|---|---|---|
| 2,677,367 | 5/1954 | Telkes | 126/263 |
| 4,091,863 | 5/1978 | Schroder | 165/1 |
| 4,109,702 | 8/1978 | Greene | 165/1 |
| 4,119,556 | 10/1978 | Chubb | 252/70 |
| 4,153,047 | 5/1979 | Dumbeck | 126/400 |
| 4,272,392 | 6/1981 | Lane et al. | 252/70 |
| 4,273,667 | 6/1981 | Kent et al. | 252/70 |
| 4,406,806 | 9/1983 | Despault et al. | 252/70 |

FOREIGN PATENT DOCUMENTS 7590584 7/1975 Japan .

OTHER PUBLICATIONS

Storonkin et al., "Thermodynamics of Ternary Eutectic and Peritectic Systems," Vop. Termodin. Geterogennykh Sist. Teor. Poverkh. Yavlenii, 1971, No. 1, 3–51. (Chem. Abstracts 76, 159008z).
Atamanova et al., "Effect of a Third Component on Phase Equilibriums in the Cadmium–Mercury System," Izv. Akad. Nauk Kaz. SSR, Ser. Khim. 1983, (3), 51–5. (Chem. Abstracts 99: 26487h).

Primary Examiner—Paul Lieberman
Assistant Examiner—Robert A. Wax
Attorney, Agent, or Firm—Denis G. Maloney; Richard M. Sharkansky

[57] ABSTRACT

A thermal energy storage system for storing heat from a solar collector in which latent heat transitions are used to store energy. Ternary systems are disclosed wherein the addition of a third compound gives an additional degree of freedom in controlling crystallization conditions. More specifically, the third compound is used to reduce the amount of incongruent melting found in binary systems of salt hydrates. Preferably, the compounds selected produce a composition whose crystal density approximately equals the liquid density in order to further reduce the segregation of the crystalline phase during the crystallization cycle. Preferred compositions of the storage medium are selected from the hydrates of sodium sulfate, sodium carbonate and dibasic sodium phosphate.

10 Claims, 8 Drawing Figures

THERMAL ENERGY STORAGE

BACKGROUND OF THE INVENTION

The use of phase change materials to store heat energy has been known for some time.

The potential of the salt hydrates for storage materials was recognized by M. Telkes, "Solar Energy Storage", ASHRAE Journal, September, 1974, pgs. 38–44. She identified several inexpensive salt hydrates with useful freeze-thaw characteristics. Typical salts are $Na_2SO_4.10H_2O$, $Na_2HPO_4.12H_2O$ and $MgSO_4.7H_2O$. The large latent heat of the ice-water transition (80 cal/g or 143 Btu/lb) suggests that salt hydrates with many water molecules will have a similarly large heat content. Although this is true in general, one problem with their use in thermal storage applications is that hydrates with large water content tend to have low melting temperatures, making it difficult to extract heat rapidly. Also, many of the hydrates melt incongruently, i.e., to a liquid and a second crystalline phase of different composition. This incongruent melting leads to segregation effects which degrade the storage capacity. Segregation effects may be avoided in the congruently melting compounds, such as hydrates of ferric chloride and sodium thiosulfate (photographer's "hypo"); compounds, which in effect, dissolve in their own waters of crystallization. Unfortunately, however, there are stability problems (hydrolysis) with these two compounds and with many other congruently melting hydrates which make them unsuitable for long-term storage.

The cerrobend eutectic is an alloy mixture with good thermal conductivity, about 10 times that of water, but materials cost makes this candidate a very unlikely choice.

The salt eutectics mentioned above are typical of a number of different compositions, most of which are in a temperature range that is too high for simple home heating. The recombination of compounds like $Mg(OH)_2$ yields reasonable quantities of heat but again requires a high temperature source to drive the reaction. The reaction must be carefully controlled to avoid a dangerous pressure built up during the conversion of the hydroxide to $MgO + H_2O$ and is therefore not suitable for domestic use.

SUMMARY OF THE INVENTION

These and other problems are solved by the present invention by providing a ternary mixture of predetermined compounds whose volume change on melting is near zero and whose transition temperature is suited to domestic heating needs. Basically, the invention may be understood as the addition of a third compound to a binary system of selected elements to change the phase transitions of the binary system in order to substantially eliminate the incongruent melting and the resulting deleterious segregation effects present in the selected binary system.

As disclosed by the present invention, the three major elements of the ternary system are selected to produce binary compounds whose joining line has at least a portion sufficiently close to the nearest phase boundary to provide substantially isothermal crystallization of melt compositions along said line portion. To put it in another way, the three elements of the ternary system are selected such that a portion of a resulting join of binary compounds is closer to the phase boundary line than any of the binary compounds present in a binary system formed by any two of the elements of the ternary system.

In the preferred embodiment, the invention provides for a ternary mixture of inexpensive salt hydrates. Preferably, the ternary mixture is chosen from the hydrates of sodium sulfate, sodium carbonate and dibasic sodium phosphate, and the composition is selected from a predetermined region close to the phase boundary line in the vicinity of the join of the binary compounds.

BRIEF DESCRIPTION OF THE DRAWINGS

These and other advantages of the invention will become apparent as the description thereof progresses, reference being had to the accompanying drawings wherein.

DESCRIPTION OF THE PREFERRED EMBODIMENT

The invention provides a ternary mixture of inexpensive salt hydrates having large heat content at temperatures convenient for solar collection and suited for domestic space heat. The compounds identified comprise the hydrates of sodium sulfate ($Na_2SO_4.10H_2O$), of sodium carbonate ($Na_2CO_3.10H_2O$), and of dibasic sodium phosphate ($Na_2HPO_4.12H_2O$). Before proceeding to a detailed description of the mixtures contemplated by the present invention, it is advantageous to discuss the crystallization characteristics of the three binary systems, each binary system comprising a different one of the hydrate salts just mentioned, in order to understand the problems created by the incongruent melting that is common to all three, as well as many of the salt hydrates that are known. Incongruent melting is one of the most serious problems that prevent their successfull use in heat storage applications.

Figure 1:
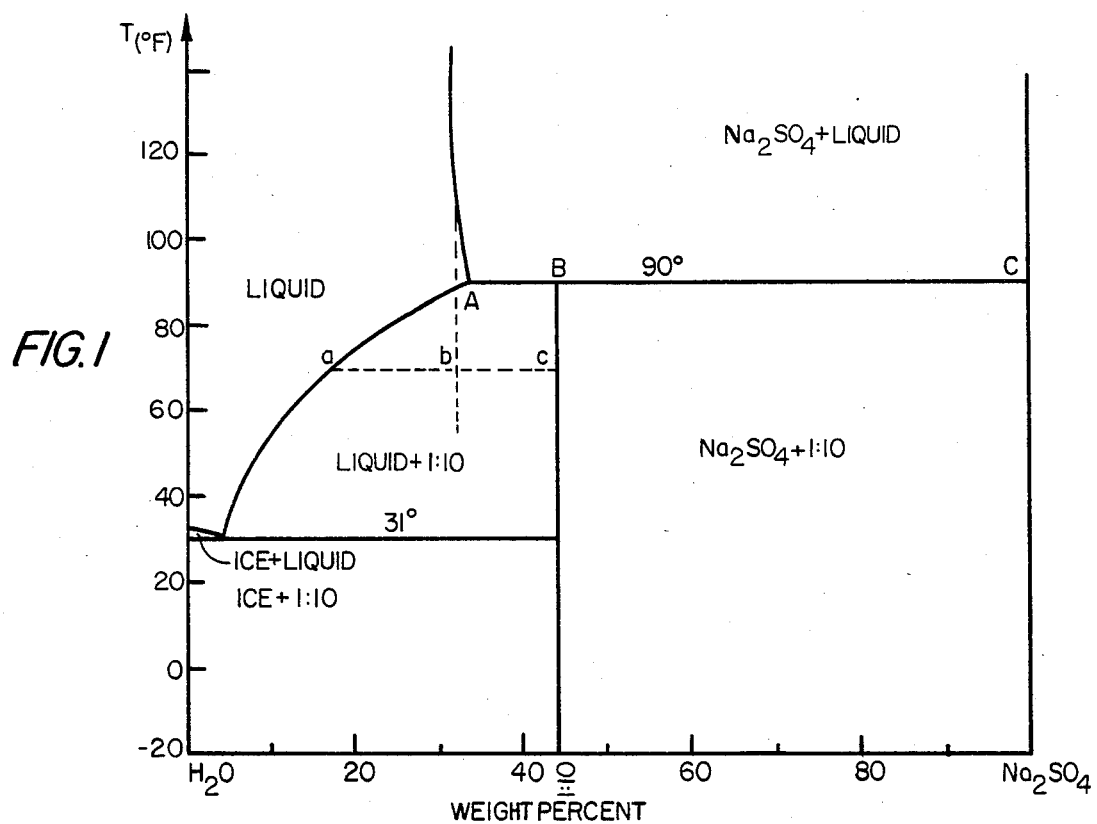
FIG. 1 shows the phase relations in the binary system $H_2O$ - $Na_2SO_4$.

The binary system $Na_2SO_4.10H_2O$ will be considered first. The heat of fusion of $Na_2SO_4.10H_2O$ is 108 Btu/lb, about ¾ of the heat content of the ice-water transition. Referring now to FIG. 1, there is shown the phase diagram which summarizes the composition-temperature relationships in the binary system. As shown, the only binary compound is the decahydrate, which melts incongruently at 90° F. to a liquid containing 33 wt. percent $Na_2SO_4$ and a residue of solid $Na_2SO_4$. Just above 90° F. the amount of these two phases is given by the Lever rule as AB/AC or 17 percent $Na_2SO_4$ and BC/AC (83 percent) liquid solution. Under equilibrium cooling conditions the liquid and anhydrous sulfate will recombine to freeze as a single phase hydrate. In reality, a segregation of the Na$_2$SO$_4$ (sp. gr.=2.65) from the liquid (sp. gr.=1.34) occurs by settling, which effectively removes the solid from the system and shifts composition from B to A in FIG. 1. The freezing process for composition A is quite different from B; instead of an isothermal transition from liquid plus Na$_2$SO$_4$ to a singly crystalline compound, the A mixture begins to crystallize hydrate below 90° F., but liquid is present all the way down to the ice:hydrate eutectic at 31° F. If the composition is cycled between 70° and 100° F. and if the precipitated Na$_2$SO$_4$ does not recombine with the other components, the amount of hydrate is a maximum at 70° F. (distance ab/ac or 55 percent by weight of hydrate). This means only 55 percent of 108 Btu/lb is available as latent heat content. The effectiveness of the process has been reduced in two ways: (1) a dilution in hydrate lowers the latent heat content by 45 percent, and (2) the transition is now spread over a temperature interval rather than occurring isothermally, thus eliminating one of the principal advantages of latent materials over sensible heat storage.

The physical segregation which occurs in composition B can be reduced by adding a few volume percent of an inert thickening agent. This keeps the precipitating Na$_2$SO$_4$ from settling out of the reaction zone. Another approach is to divide the salt into small packets, where interdiffusion distances are short enough for the recombination of Na$_2$SO$_4$ and solution during freezing to yield the single phase decahydrate. The disadvantage, however, is that the heat capacity is reduced from 108 Btu/lb to about 40 Btu/lb for the salt with thickening agent and encapsulation. As was pointed out earlier, a cycling between 100° F. and 70° F. results in crystallization of 55 percent of the decahydrate (distance ab/ac at 70° F. in FIG. 1) which releases $0.55 \times 108 = 59$ Btu/lb to which one should add the specific heat between 100° and 70° F., another 12 Btu/lb. An advantage of the water excess mixture is that a solution is always present to act as a heat transfer medium in contact with heat exchange surfaces. The disadvantage of using composition A relative to B is the nonisothermal nature of the freezing process. This invention provides an alternative which avoids the Na$_2$SO$_4$ segregation without the loss of isothermal heat release by resorting to more complex ternary compositions. A discussion of this will be deferred until later so that a second important binary, sodium carbonate-water may be considered. Suffice it to say for now, that a third compound is added to produce a different phase diagram which results in the selection of a mixture having nearly isothermal freezing characteristics.

Figure 2:
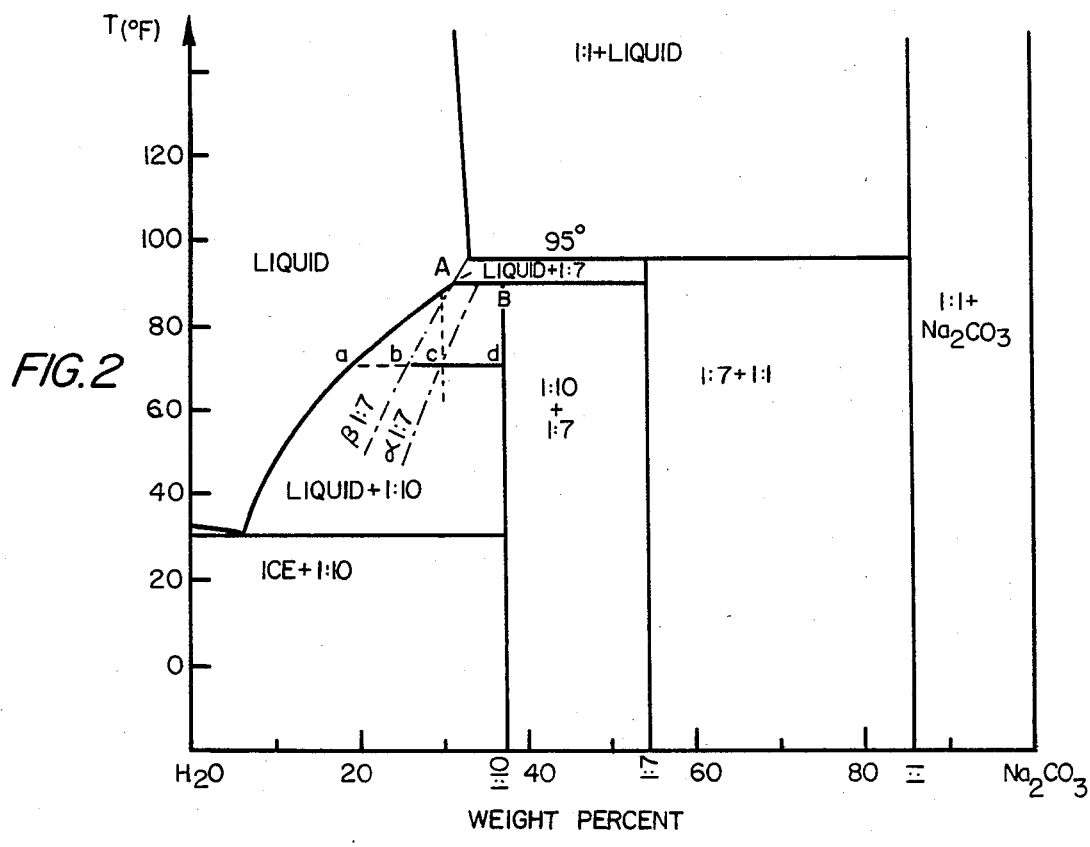
FIG. 2 shows the phase relations in the binary system $H_2O$ - $Na_2CO_3$.

The binary system Na$_2$CO$_3$-H$_2$O shown in FIG. 2 contains three hydrates with 10, 7, and 1 waters of crystallization. Since heat content is proportional to crystallized water content, the decahydrate is the most desirable phase. The monohydrate is similar to anhydrous Na$_2$SO$_4$ (FIG. 1) in that incongruent melting and some settling occur, but there is the added disadvantage that the high temperature hydrate retains some of the heat content associated with its crystallized water, i.e. there is less latent heat release because the monohydrate retains the bond energy (enthalpy) associated with the retained water of hydration. The incongruent melting of the 10-hydrate occurs at about the same temperature as in the sulfate system, but there are some metastable solubility effects that introduce complications in the carbonate system.

Metastability occurs when a high temperature form fails to convert at the equilibrium transition temperature, persisting to much lower temperatures. The metastable compounds have their own metastable solubility curves which are extensions of the stable curves from higher temperatures. In FIG. 2, two of these metastable curves associated with the 7-hydrate compound are shown extending into the field of 10-hydrate plus solution. When this metastable crystallization occurs, the heat capacity is only a small fraction of its normal value because (1) a 7-hydrate rather than 10-hydrate freezes out, and (2) the ratio of hydrate to solution is smaller than the equilibrium ratio.

The problem of metastable crystallization is best shown by a specific example. When the 10-hydrate composition (37 percent Na$_2$CO$_3$) is cooled from 95° F., where liquid plus 7-hydrate are in stable coexistence, there are two possibilities: (1) equilibrium conversion from the 7-hydrate to the 10-hydrate at 90° F., or (2) a nonequilibrium crystallization of either the $\alpha$ or $\beta$ form of the 7-hydrate plus liquid over a range in temperature. The tendency to form the metastable hydrate phases depends primarily on the rate of cooling, although impurities and other factors can also play a role. To see just how much heat capacity is lost by this metastable crystallization, let us compare the latent heat released for the 10-hydrate composition under both sets of conditions. At equilibrium the heat release in 10-hydrate crystallization is 105 Btu/lb. Assuming the beta 7-hydrate heat content is 70 percent of this value, the Lever rule and the solubility data in FIG. 2 are used to estimate the amount of beta 7-hydrate phase at 70° F. The proportion is equal to distance bc/bd=33 percent 7-hydrate and 67 percent solution b. The heat content is then $105 \times 0.7 \times 0.33 = 24$ Btu/lb for the latent transition. If conditions are such that the alpha 7-hydrate phase crystallizes, the latent heat release would be even less.

It is obviously very important to avoid the primary crystallization field of the 7-hydrate so that these metastable conditions can be averted. One approach is to shift the bulk composition from the 10-hydrate at B to point A, sacrificing somewhat in heat content (percent hydrate) and in an extended temperature range rather than the isothermal transition at B. Also there is the possibility of avoiding metastable conditions by adding an additional component, as disclosed by the present invention, and that will be discussed after consideration of the third binary, sodium phosphate.

Figure 3:
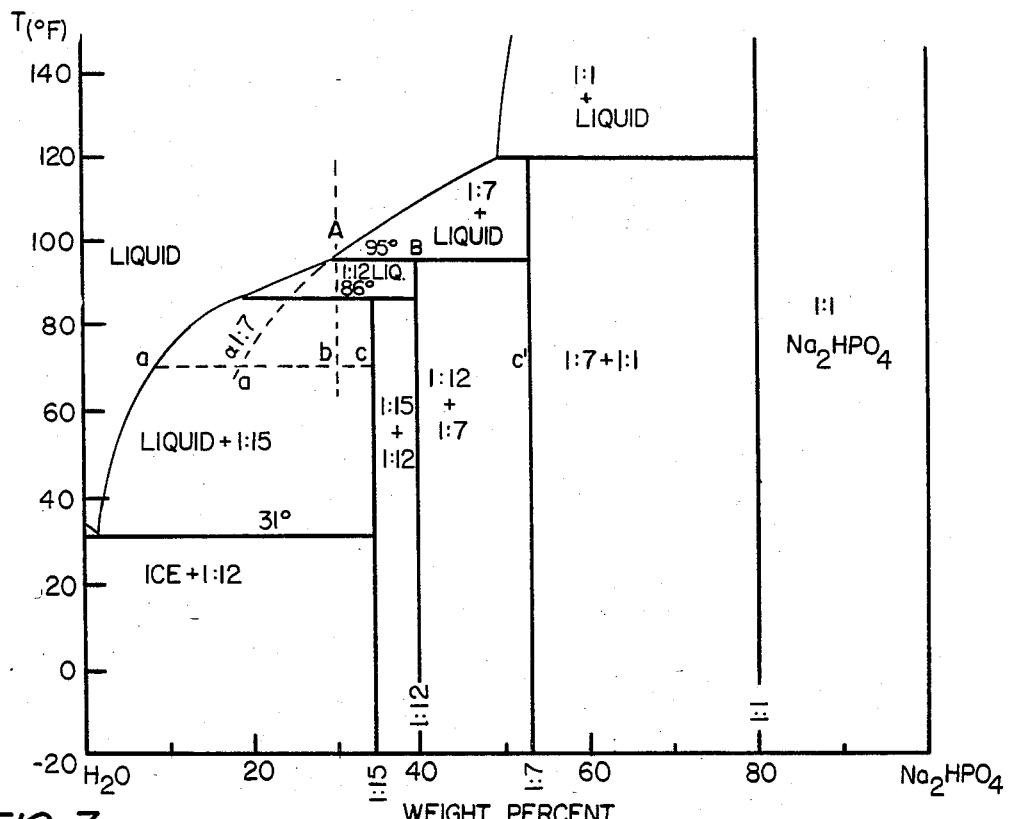
FIG. 3 shows the phase relations in the binary system $H_2O$ - $Na_2HPO_4$.

Phosphoric acid is tribasic and therefore forms three groups of anhydrous sodium salts, Na$_3$PO$_4$ (tribasic), Na$_2$HPO$_4$ (dibasic) and NaH$_2$PO$_4$ (monobasic). The tribasic salt solutions are highly alkaline (pH=11) and therefore unsuited for domestic storage applications. The dibasic salts of Na and other alkalies give nearly neutral solutions (pH=8), whereas the monobasic salts tend to acidic (pH=4) solutions. From the viewpoint of safety and avoidance of corrosive conditions, the dibasic salt is clearly best suited for the storage of domestic space heat. Phase relations in the binary system H$_2$O-Na$_2$HPO$_4$, derived primarily from International Critical Tables, 4, p. 246 are shown in FIG. 3. There are four hydrate compounds with 15, 12, 7 and 1 waters of crystallization. Transition temperatures for the 12- and 15-hydrates are again in the range of 80°-90° F., which is useful for latent heat storage. The anhydrous Na$_2$HPO$_4$ and monohydrate compounds do not have their primary crystallization fields extending above the 12- and 15- hydrate compounds, the melting being very nearly congruent except for the incursion of the 7-hydrate field. The various hydrates have densities very similar to the saturated solution, so that segregation effects are minor. At 90° F., for example, the density of the 12-hydrate compound is 1.51 g/cc, whereas a solution of the same composition at 110° F. is 1.41 g/cc.

The shape of the liquidus curve in the 12- and 15-hydrate regions indicates that percent crystallization in water-rich melts, and therefore percent latent heat recovery, is larger in this system than in either the sulfate (FIG. 1) or carbonate (FIG. 2) systems discussed previously. For example, in cycling composition A between 70° and 100° F., one can determine by inspection that percent equilibrium crystallization is ab/ac, or 84 percent. From reported values of 114 Btu/lb, this translates to $114 \times 0.84 = 95$ Btu/lb for the latent heat capacity of composition A. The metastable extension of the 7-hydrate solubility curve again indicates that there is some danger in losing heat capacity through metastable crystallization. To eliminate this possibility one should avoid the stability field of the 7-hydrate compound.

In the three binary salt hydrate systems described in the foregoing, there were instances where anhydrous salts or certain salt hydrates with metastable extensions have produced undesirable effects. The only recourse in avoiding these phases was to move bulk composition to a higher water content, accepting the dilution and extended crystallization temperature range. With the addition of a third component, there is an extra degree of freedom in liquid composition, giving more opportunity to control crystallization conditions. In ternary systems the added degree of freedom changes the univariant binary liquidus curve into a divariant liquidus surface. The binary invariant eutectic and peritectic points become univariant lines called boundary curves separating the primary crystallization fields of the various phases. In general, avoidance of unwanted phases by the addition of an additional component has the effect of reducing the transition temperatures. However, the temperature decrease can still be maintained within the practice limits of a solar-type heat collection system. In the following, the detailed crystallization paths for a few ternary salt systems will be considered. The data in constructing these diagrams has been taken primarily from the International Critical Tables and Seidell's solubility data, A. Seidell, Solubilities of Inorganic and Metal Organic Compounds, Vol. 1, New York 1940.

Figure 4:
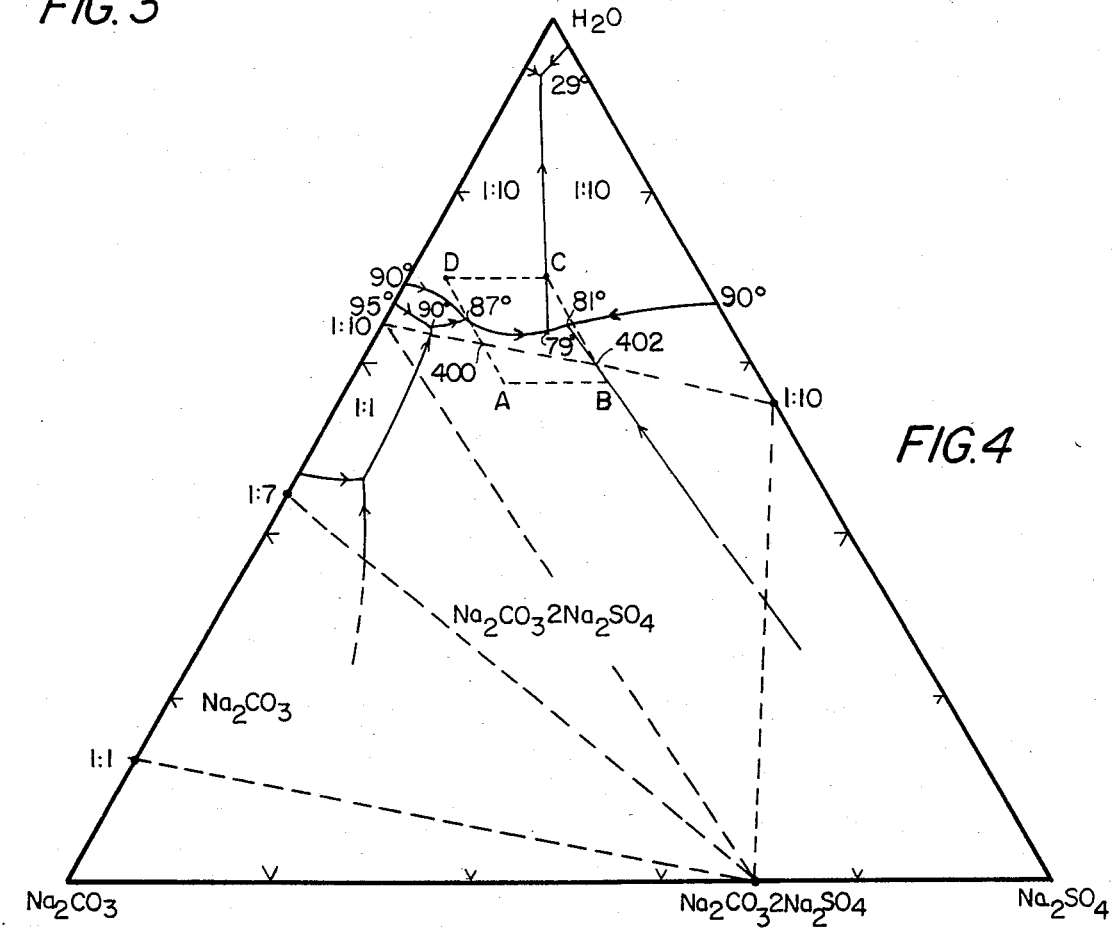
FIG. 4 shows the phase relations in the ternary system $H_2O$ - $Na_2CO_3$ - $Na_2SO_4$.

The ternary system $Na_2CO_3$-$Na_2SO_4$-$H_2O$ will be considered first. FIG. 4 is a ternary diagram of the system $Na_2CO_3$-$Na_2$-$SO_4$-$H_2O$. This system can be considered as the result of the addition of $Na_2CO_3$ to the $Na_2SO_4$ hydrate, which is done to change the phase diagram of the $Na_2SO_4$ binary system. The resulting ternary diagram is a projection of the liquidus surface showing the primary crystallization fields of each phase separated by boundary curves which represent composition-temperature data for coexisting liquid and crystalline phases. The intersection of three boundary curves defines ternary invariant points which can be either eutectic or peritectic in nature in the liquidus regime. The dashed lines connecting the various crystalline phases are called compatibility triangles. These triangles help to define the nature of the invariant points at the boundary curve intersections. If a given invariant point falls within the compatibility triangle for the three crystalline phases present, the point is a eutectic. For example, the intersection of the primary crystallization fields for ice and the two 1:10 hydrate phases falls within the corresponding compatibility triangle and is therefore an eutectic. Mixtures within the compatibility triangle $H_2O$-1:10 carbonate-1:10 sulfate will end crystallization at the ternary eutectic near the $H_2O$ apex. The eutectic temperature is at 29° F., a few degrees below the ice point. All of the other ternary invariant points located near the 1:10 hydrate join are outside of their respective compatibility triangles and will therefore be peritectic-type transition points where one solid phase must disappear before the liquid composition can move to the next invariant point.

Note that the primary fields of $Na_2SO_4$ and the 1:7 carbonate hydrate pinch out as one proceeds towards compositions in the center of the ternary. Also, the boundary curves have moved much closer to the decahydrate join in the center region, a fact of great significance for hydrate crystallization. This means, in effect, that the anhydrous phase overlying the decahydrates has moved back almost to the point of allowing congruent crystallization. If compositions are chosen on the hydrate join between compositions 400 and 402 on the 1:10 join, i.e. for compositions in the range of 16% to 26% $Na_2CO_3$, 12% to 24% $Na_2SO_4$ and 62% to 60% $H_2O$, the freezing out of the 1:7 carbonate hydrates and the anhydrous $Na_2SO_4$ phases are avoided entirely. For compositions in this region of the join, the anhydrous $Na_2CO_3$-$2Na_2SO_4$ is the stable phase at high temperature. However, its crystallization is limited to about 7 percent by weight before intersection with the ternary boundary curve and the crystallization of one or both of the decahydrate phases. Crystallization ends at the transition point at 79° F. for all compositions initially on or below the decahydrate join. Thus, the preferred composition for this ternary system is found in the region ABCD shown in FIG. 4, whose compositions, as % wt., are as follows:

|  | A | B | C | D |
| --- | --- | --- | --- | --- |
| $Na_2SO_4$ | 16 | 25 | 14 | 4 |
| $Na_2CO_3$ | 26 | 17 | 16 | 26 |
| $H_2O$ | 58 | 58 | 70 | 70 |

Figure 5:
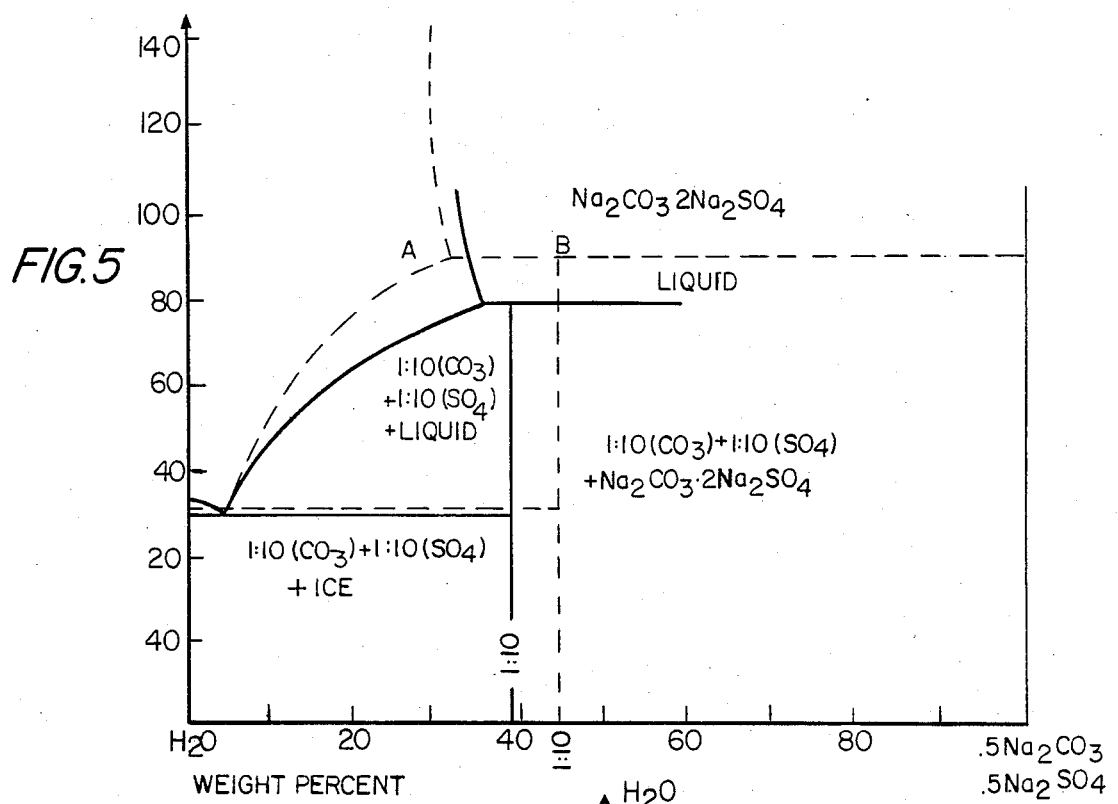
FIG. 5 shows the equilibria in a pseudo-binary projection from the ternary system $H_2O$ - $Na_2CO_3$ - $Na_2SO_4$.

To give a better physical picture of what is actually accomplished by resorting to these ternary compositions, a pseudo-binary projection bisecting $Na_2CO_3$-$Na_2SO_4$ sideline and the $H_2O$ apex is shown in FIG. 5. The figure also shows in dashed outline $Na_2SO_4$-$H_2O$ binary to indicate the changes in overlap of the stability field of the anhydrous salt and the decrease in peritectic freezing temperature. The decrease in the overlap of the $Na_2CO_3$-$2Na_2SO_4$ phase field means less solids separation when the hydrate is heated above the peritectic and therefore less diffusional transport is needed for crystallization of the hydrate during the heat extraction (cooling) phase.

It is expected that the addition of any one of three components mentioned hereinabove, i.e. $Na_2SO_4$, $Na_2CO_3$ and $Na_2HPO_4$, as the third compound in the binary system formed by a different one of the three salt hydrates will result in a similar change of the resulting ternary phase diagram, thus producing a significantly closer approach to congruent melting. The ternary system $Na_2HPO_4$-$Na_2SO_4$-$H_2O$ will now be considered. In this example, the binary system formed by the hydrate of $Na_2HPO_4$ comprises a phase that has fairly high peritectic temperature (95° F.) and large heat of fusion but some tendency for metastable crystallization of the 1:7 hydrate, which could be avoided by the ternary mixture produced by the addition of $Na_2SO_4$ as the third compound.

Figure 6:
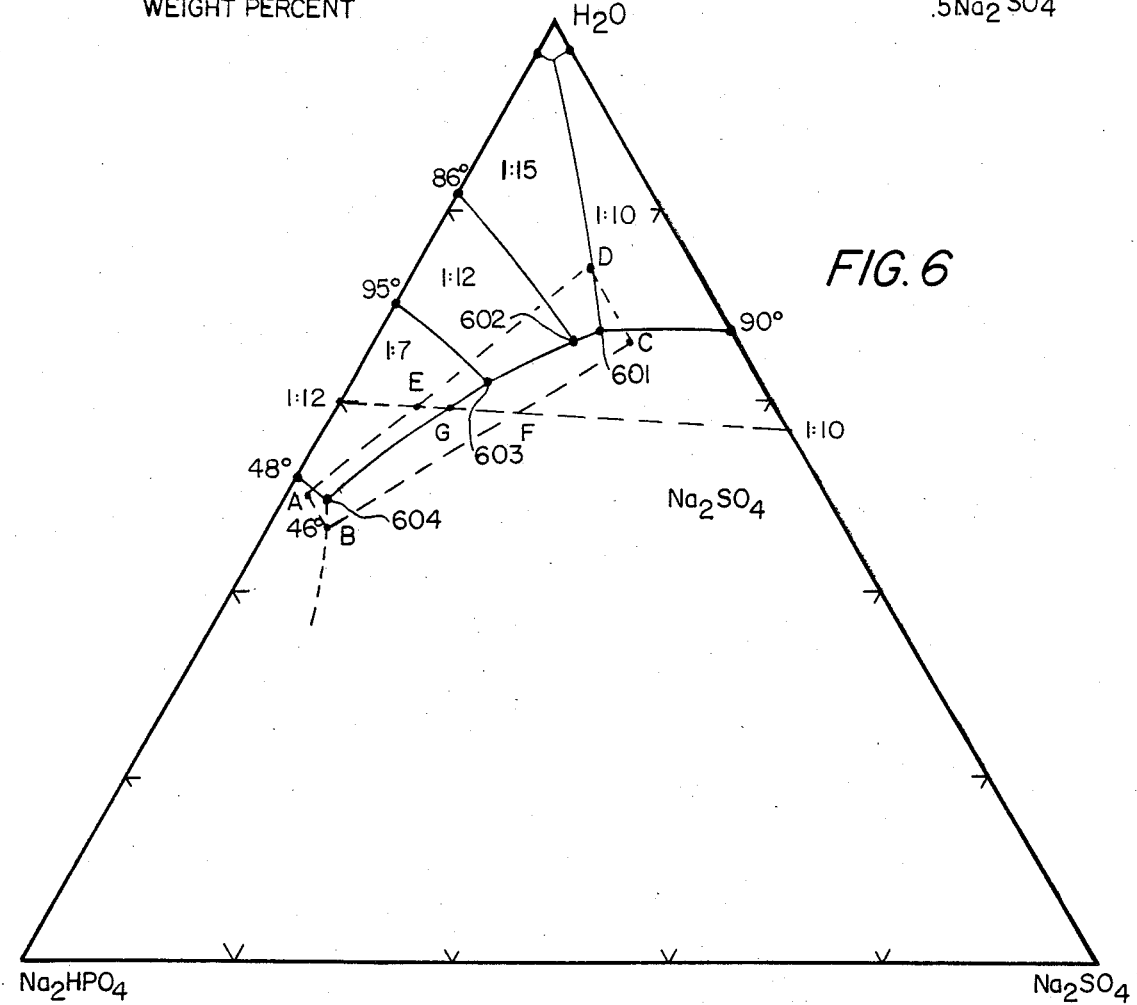
FIG. 6 shows the phase relations of the ternary system $H_2O$ - $Na_2HPO_4$ - $Na_2SO_4$.

Based on the known binary compounds and the ternary equilibria found experimentally, the ternary diagram for this system is shown in FIG. 6. The invariant point separating the crystallization fields of 12-hydrate ($HPO_4$), 10-hydrate ($SO_4$), and $Na_2SO_4$ phases marked (601) occurs at a temperature of 77° F. Other invariant points marked (602) at 81° F., (603) at 91° F. and (604) at 115° F. are also shown in FIG. 6. Depending on starting composition, the ternary mixtures in the trapezoid segment bounded by $Na_2SO_4.10H_2O$, $Na_2SO_4$, $Na_2HPO_4$ and $Na_2HPO_4.12H_2O$ will all terminate freezing at one of these hour points, providing equilibrium is maintained. For example, the composition corresponding to point E on the hydrate join begins crystallization of 7-hydrate phases at 97° F. and ends crystallization at the invariant peritectic point, labelled 601 near point D whose temperature is at 77° F. This is considerably closer to isothermal crystallization than one could achieve with binary mixtures. The composition in this case is 7% $Na_2SO_4$, 33% $Na_2HPO_4$, a 60% $H_2O$. As a further example, the composition shown at G begins crystallizing $Na_2SO_4$ and 1:7 hydrate simultaneously, the liquid composition then moves to the next invariant point 603 at 91° F. At this point, the 1:7 hydrate redissolves, and the 1:12 hydrate then begins crystallizing with $Na_2SO_4$, with the liquid composition changing along the boundary curve until the next invariant point 602 is met at 81° F. At this point, all the liquid crystallizes, thus producing a nearly isothermal crystallization. Compositions contemplated by the present invention for this ternary system lie in the region shown as ABCD in FIG. 6. Preferably, the composition selected is within the region ABEF. The composition of the points defining the regions of interest are, as % wt., as follows:

|           | A  | B  | C  | D  | E  | F  |
|-----------|----|----|----|----|----|----|
| $Na_2SO_4$  | 2  | 6  | 16 | 24 | 7  | 17 |
| $Na_2HPO_4$ | 48 | 48 | 10 | 10 | 33 | 25 |
| $H_2O$      | 50 | 46 | 74 | 66 | 60 | 58 |

Figure 7:
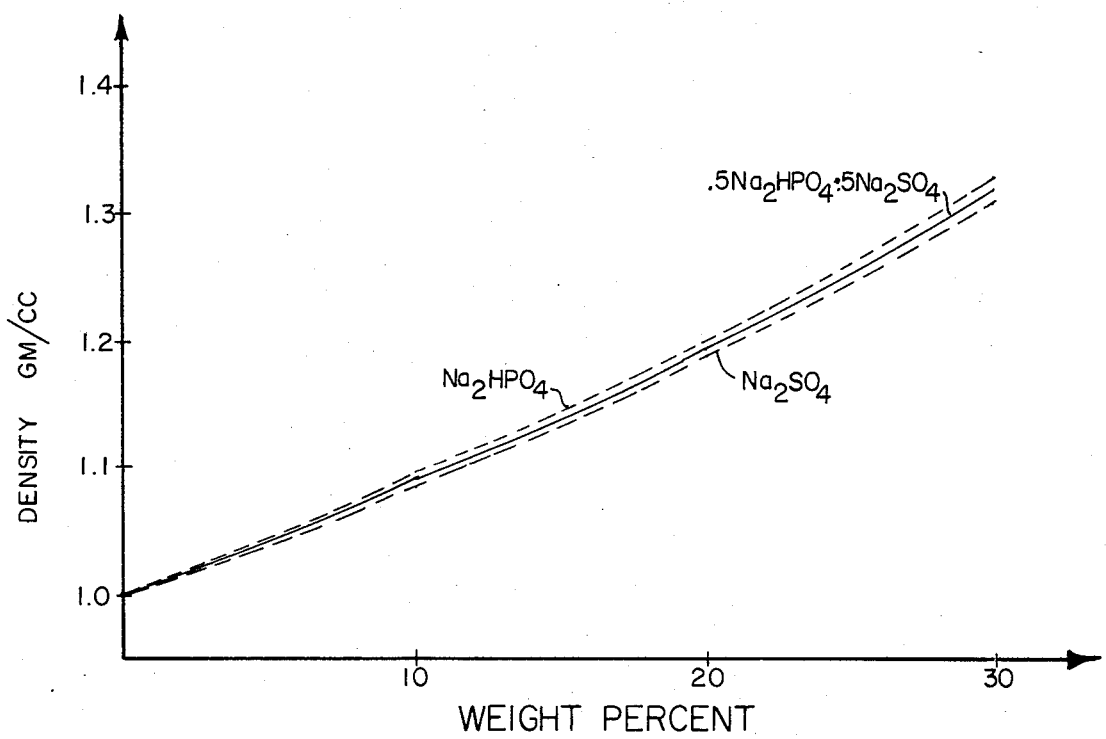
FIG. 7 shows the density as a function of the concentration for salt solutions of $Na_2HPO_4$ and $Na_2SO_4$, and a solution equivalent to $0.5Na_2HPO_4$ - $0.5Na_2SO_4$.

It was found that in water rich mixtures the liquid density is a linear function of weight/percent salt present, see FIG. 7, therefore extrapolating into regions of crystallization, the liquid density at point E is 1.4 g/cc and the solid density of 1:12 hydrate and 1:10 hydrate have densities of 1.52 and 1.46 respectively, within 8% of the liquid density. This can be contrasted with the binary case for $Na_2SO_4$-$H_2O$, where the crystallized $Na_2SO_4$ has a density of 2.68 g/cc and the liquid has a density 1.31 g/cc. When the density difference is small, as in the preferred embodiment, gravitational segregation can be minimal, particularly if the crystallization temperature range is also small as we have provided.

It is expected that similar results apply to the $H_2O$-$Na_2CO_3$-$Na_2HPO_4$ ternary system. In other words, the addition of $Na_2CO_3$ to the binary system $H_2O$-$Na_2HPO_4$, or analogously the addition of $Na_2HPO_4$ to the binary system $H_2O$-$Na_2CO_3$, produces a resulting phase diagram that provides for ternary compositions having nearly isothermal crystallization characteristics. More specifically, the selected mixtures are near the join between $Na_2CO_3.10H_2O$ and $Na_2HPO_4.12H_2O$, and near the boundary curve separating the $Na_2CO_3$ crystallization field from the hydrated phosphate phase. The mixture on the $Na_2CO_3.10H_2O$-$Na_2HPO_4.12H_2O$ join would be identically configured as point E of the $Na_2SO_4$-$Na_2HPO_4$-$H_2O$ ternary system of FIG. 6.

The present invention has shown that salt hydrate systems can be found which will allow the storage of significant amounts of latent heat. The problems of phase segregation and metastable equilibria which degrade performance in binary salt-water mixtures can be avoided by adding a third compound to a su:table salt hydrate to produce a ternary phase transition having substantially isothermal crystallization. The reduction in the fusion temperature is an acceptable tradeoff, since the heat content and the nearly isothermal nature of the transition can be preserved.

Figure 8:
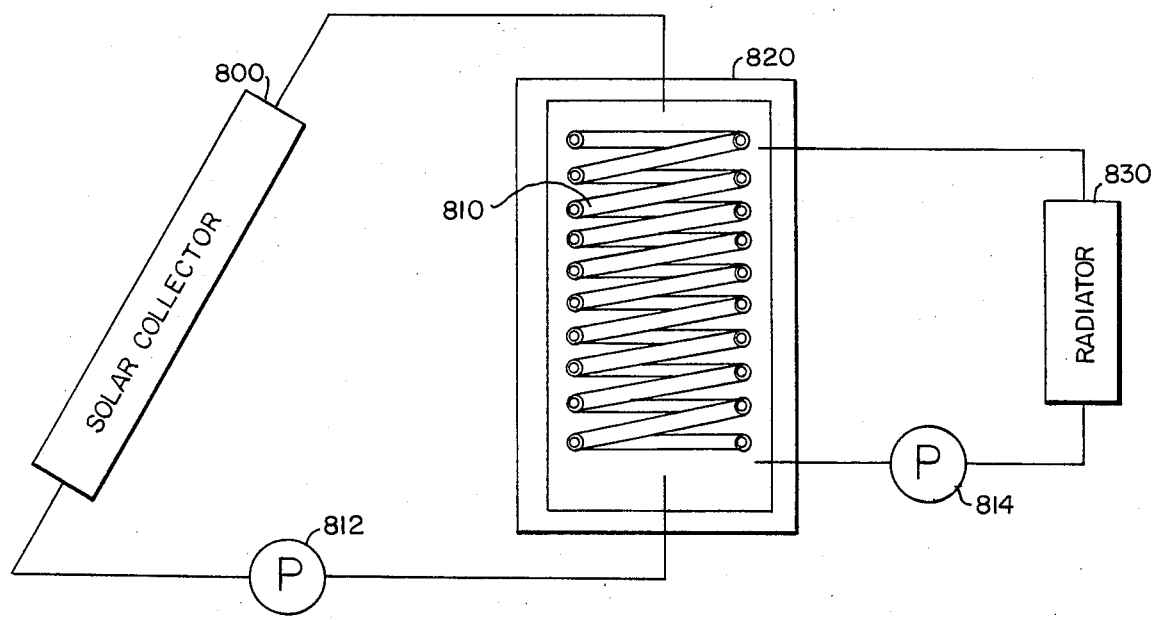
FIG. 8 shows a thermal energy storage system embodying the present invention.

Such ternary compositions are advantageously used in thermal energy storage applications. Referring now to FIG. 8, there is shown a thermal energy storage system particularly suited for domestic heating. A solar collector 800 is used to transfer thermal energy to a container 810 having a ternary composition therein selected according to the teachings of the present invention. Container 810, for example a coil of metal or plastic construction with sufficient surface for heat exchange, is placed within an insulated container 820. The transfer of thermal energy from collector 800 to container 810 takes place via a suitable exchange medium, such as water forced by pump 812 during the portion of time when solar energy is available. The collected thermal energy melts the solid phase of the selected ternary compound and heat is thus stored in the liquid phase of such compound. When the stored thermal energy needs to be recovered, as space heating for instance, the heat exchange cycle is reversed, and the cooler water from radiator 830 in the space to be heated is now passed by pump 814 over the container 810 absorbing the heat stored in the ternary compound. The heated water is pumped through radiator 830 to heat the air around it. As the heat stored in the liquid phase is transferred from such ternary compound, the compound begins to crystallize, and crystallization continues until all the thermal energy is recovered and the compound is entirely crystalline. The process can now be reversed again, and as solar energy becomes again available the heat transferred from the collector can be used to melt the solid phase of the compound, thus storing energy again in its liquid phase.

Container 810 is helical in shape to provide a larger surface area for efficient heat exchange. By using a container of such ternary compound elongated in the horizontal direction and having a relatively small dimension along the vertical direction, any residual segregation effect of the selected ternary compound is also minimized. This is achieved reducing the diffusion distance and maximizing the surface contact area of any crystal that settles at the bottom of container 810.

This concludes the description of the preferred embodiment. Although preferred embodiments of the invention have been described, it is believed that numerous modifications and alterations thereto would be obvious to one skilled in the art without departing from the spirit and scope of the invention.

What is claimed is:
1. A process for producing a heat storage medium comprising the steps of:
   providing a first mixture of first and second compounds having first predetermined composition-temperature characteristics; and adding to said mixture a third compound to change said characteristics of said first mixture, said three compounds and the relative proportions of the three compounds of the resulting mixture being such that when added together substantially peritectic isothermal crystallization occurs.

2. A method of storing thermal energy comprising the step of:
transferring thermal energy to a latent heat thermal energy storage medium comprising a ternary mixture including water and two compounds selected from the group of sodium sulfate, sodium carbonate and dibasic sodium phosphate, said mixture having substantially peritectic isothermal crystallization characteristcs.

3. A method of producing a latent heat storage medium comprising the steps of:
providing water;
selecting two salts to provide a ternary system having stable hydrated salts as binary compounds of said system, said ternary system having a phase diagram in which melt compositions for at least a portion of the line joining two of the binary compounds are substantially closer to the nearest phase boundary representing peritectic melting than the peritectic melt composition of any of the binary compounds present in a binary system formed by water and any one of the two salts forming said ternary system; and
selecting the relative composition of said water and two salts along said line portion to provide a peritectic crystallization path along said nearest phase boundary.

4. A composition for the storage of thermal energy comprising a mixture of water and two salts selected to produce a ternary system having substantially peritectic isothermal crystallization.

5. A composition for the storage of heat consisting essentially of a ternary mixture of water and two hydrates selected from the group of the hydrates of sodium sulfate, sodium carbonate and dibasic phosphate.

6. The composition of claim 5 wherein:
the density of said hydrates approximates their liquid density.

7. A composition for the storage of heat comprising a mixture from the ternary $Na_2SO_4$-$Na_2CO_3 \cdot H_2O$ system, said mixture lying in a region ABCD of the corresponding ternary phase diagram defined as % wt., as follows:

|  | A | B | C | D |
|---|---|---|---|---|
| $H_2O$ | 58 | 58 | 70 | 70 |
| $Na_2SO_4$ | 16 | 25 | 14 | 4 |
| $Na_2CO_3$ | 26 | 17 | 16 | 26 |

8. A composition for the storage of heat comprising a mixture from the ternary $Na_2SO_4 \cdot Na_2HPO_4 \cdot H_2O$ system, said mixture lying in a region ABCD of the corresponding ternary phase diagram defined as % wt., as follows:

|  | A | B | C | D |
|---|---|---|---|---|
| $H_2O$ | 50 | 46 | 66 | 74 |
| $Na_2SO_4$ | 2 | 6 | 24 | 16 |
| $Na_2HPO_4$ | 48 | 48 | 10 | 10 |

9. A process for producing a heat storage medium comprising the steps of:
providing a first mixture of water and a first salt having first predetermined composition-temperature characteristics;
adding to said mixture a second different salt to change said characteristics of said first mixture, the relative proportions of the water and two salts being sufficient to produce a substantially isothermal crystallization having a melting point less than the critical temperature of water and above a eutectic melting point of a eutectic composition of the water and the two selected salts; and
selecting said salts such that the density of each crystalline phase of the resulting mixture is substantially equal to the density of each liquid phase of the resulting mixture.

10. A composition for the storage of heat comprising a ternary mixture including water and two hydrates selected from the group of the hydrates of sodium sulfate, sodium carbonate and dibasic phosphate, the composition of said mixture being selected to produce susbstantially pertectic isothermal crystallization characteristics.

* * * * *